April 23, 1929.  A. Y. DODGE  1,710,352
HYDRAULIC BRAKE CONSTRUCTION
Filed May 31, 1924
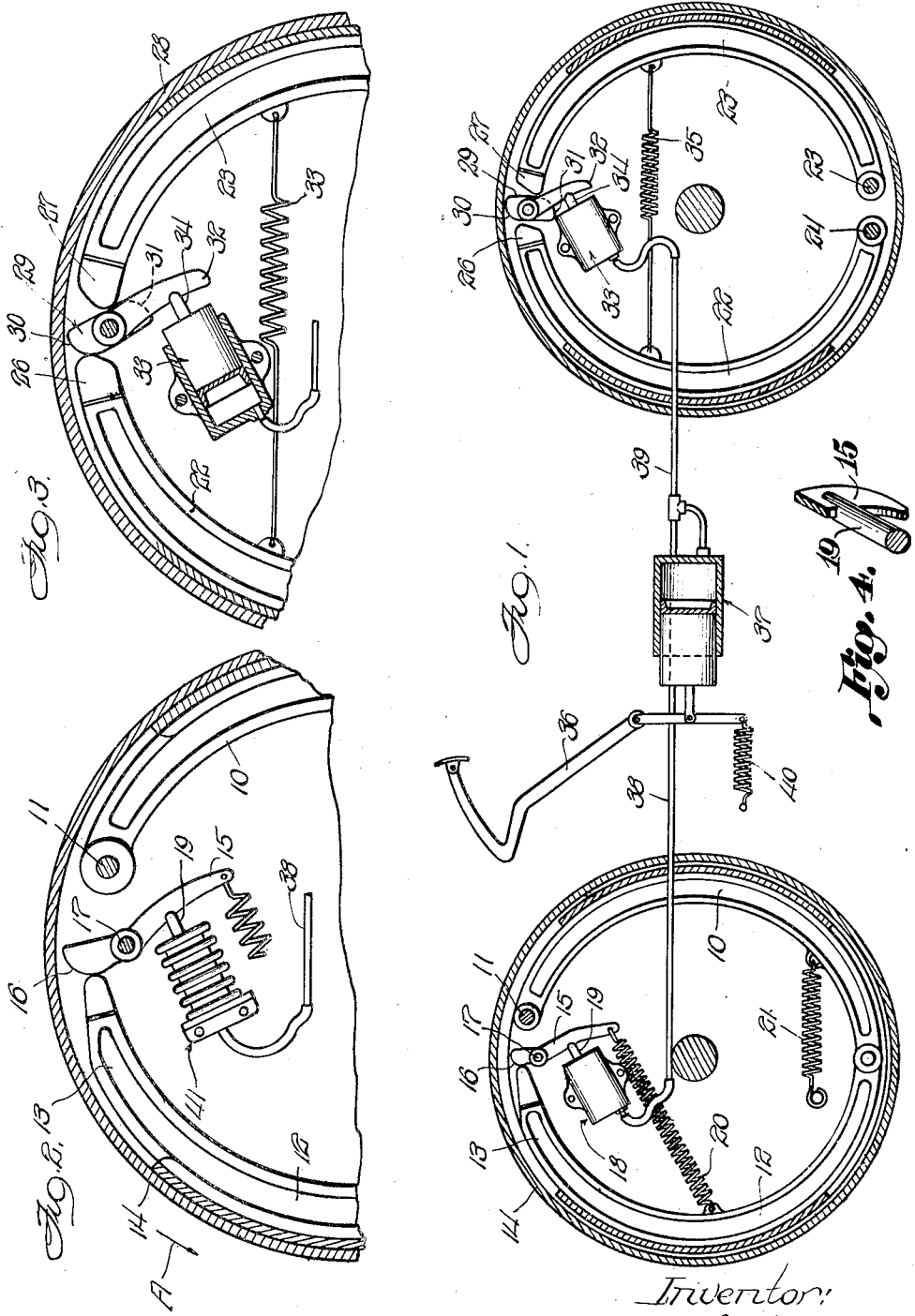

Patented Apr. 23, 1929.

1,710,352

UNITED STATES PATENT OFFICE.

ADIEL Y. DODGE, OF SOUTH BEND, INDIANA, ASSIGNOR TO THE BENDIX CORPORATION, OF CHICAGO, ILLINOIS.

HYDRAULIC-BRAKE CONSTRUCTION.

Application filed May 31, 1924. Serial No. 716,932.

My invention relates to hydraulic brake construction.

One of the objects of my invention is to provide an improved internal brake construction preferably hydraulic or other fluid power, of the brake shoe type which will be self-energizing to a large extent and which will be simple in construction and durable and efficient in use. Another object is to arrange a fluid-power braking system for a vehicle to give adequate retardation in reverse and at the same time give highly-multiplied retardation against forward movement.

Further objects will appear from the description and claims.

In the drawings, in which my invention is illustrated,—

Figure 1 is a somewhat diagrammatic sectional view showing front and rear brakes and the transmission from the brake pedal;

Fig. 2 is a fragmentary view on an enlarged scale showing a different form of brake actuator;

Fig. 3 is a fragmentary view on an enlarged scale of the rear brake mechanism and Figure 4 is a partial perspective snowing the interengagement of one of the fluid-power devices with a lever operated thereby.

Referring to the drawings in detail, the front wheel brake construction comprises a brake shoe 10 mounted to swing about the fixed pivot pin 11, a second brake shoe 12 pivotally mounted on the first brake shoe 10, and means for forcing the free end 13 of the brake shoe 12 outwardly into engagement with the brake drum 14. The means for forcing the free end of the swinging brake shoe 12 toward the brake drum comprises a cam lever 15 having a cam portion 16 engaging the point of the brake shoe 12 and pivotally mounted on the fixed pivot 17, and the cylinder and piston hydraulic actuator 18 provided with a plunger pin 19 having a forked end which engages and straddles the cam lever 15. A coil tension spring 20 is provided for returning the cam lever 15 when the pressure is released. This same spring 20 may also be used to withdraw the brake shoe 12 from engagement with the brake drum. In order to withdraw the brake shoe 10 from engagement with the brake drum, a coil tension spring 21 is provided.

The rear brake construction comprises a pair of brake shoes 22 and 23 mounted to swing about fixed pivots 24 and 25, respectively, and means for forcing the free or swinging ends 26 and 27 of these brake shoes outwardly into engagement with the brake drum 28. These means comprise a double cam 29 having two cam portions 30 and 31 for engaging the ends 26 and 27 of the brake shoes, respectively, a lever 32 for rocking the double cam and a hydraulic cylinder and piston actuator 33, the plunger pin 34 of which engages and straddles the lever 32. A coil tension spring 35 is provided for withdrawing the brake shoes 22 and 23 from the brake drum when the pressure is released.

The transmission from the brake pedal 36 to the hydraulic actuators 18 and 33 comprises a cylinder and piston hydraulic actuator 37 and the pressure tubes 38 and 39 connecting the hydraulic actuator 37 with the hydraulic actuators 18 and 33, respectively. A coil tension spring 40 is provided for returning the brake pedal when the pressure is released.

In operation, when pressure is applied to the foot pedal 36, it creates a fluid pressure in the hydraulic actuator 37 which is transmitted to the hydraulic actuators 18 and 33 through the tubes 38 and 39, respectively. The hydraulic pressure created in the actuator 18 forces the plunger 19 outwardly to act on the cam lever 15 to force the free end 13 of the brake shoe outwardly into engagement with the brake drum 14. As the brake drum rotates in the direction of the arrow A, this results in a piling up of the braking effect throughout the entire extent of the brake shoes 10 and 12, making the brake shoes "self-energizing".

The pressure in the hydraulic actuator 33 causes the plunger pin 34 to be forced outwardly to act on the lever 32 causing the double cam 29 to engage the ends 26 and 27 of the brake shoes and force them outwardly into engagement with the brake drum.

Regarding Fig. 1, in which one is facing the vehicle with the front at the left, it will be seen that adequate retardation in reverse is secured by shoe 23, which, being anchored at its clockwise end, is wedged outwardly by reverse or clockwise movement of the drum. Highly-multiplied retardation of forward movement is secured by the connected shoes 10 and 12, anchored at their counter-clockwise end at 11. Shoe 12 is urged circumferentially by the drum friction, like a clutch, forcing shoe 10 outwardly against the resistance of spring 21, while shoe 10 is itself wedged outwardly by the drum friction. Shoe 22 also retards forward movement.

Fig. 2 shows a construction somewhat different from that shown in Fig. 1, in that a flexible expansible and contractible corrugated metal hydraulic actuator 41 is substituted for the cylinder and piston actuator 18 shown in Fig. 1.

While I have shown but one form of my invention, it is obvious that it may be embodied in other forms covered and defined by the appended claims.

Having thus described my invention, what I claim as new and desire to secure by Letters Patent of the United States, is:

1. A brake comprising, in combination, a drum, a friction shoe anchored at one end within the drum, a second shoe connected to the unanchored end of the friction shoe, a lever engaging the unconnected end of the connected shoe, a spring connected at opposite ends to the lever and to the connected shoe, and an auxiliary spring arranged to insure that the connected shoe engages the drum prior to the anchored shoe when the lever is rocked.

2. A brake comprising, in combination, a drum, a friction shoe anchored at one end within the drum, a second shoe connected to the unanchored end of the friction shoe, a lever engaging the unconnected end of the connected shoe, and a spring connected at opposite ends to the lever and to the connected shoe.

3. A brake comprising, in combination, a drum, a friction device engageable with the drum, a lever arranged to force said device against the drum and pivoted intermediate its ends and having one arm extending inwardly of the drum, and a fluid-power actuator having a forked part embracing the inwardly-extending arm of the lever.

In witness whereof, I have hereunto subscribed my name.

ADIEL Y. DODGE.